United States Patent
Hegde et al.

(10) Patent No.: US 9,239,738 B2
(45) Date of Patent: Jan. 19, 2016

(54) MIGRATION OF LOGICAL PARTITIONS BETWEEN TWO DEVICES

(71) Applicant: International Business Machines Corporation, Armonk, NY (US)

(72) Inventors: Nikhil Hegde, Round Rock, TX (US); Prashant A. Paranjape, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 46 days.

(21) Appl. No.: 14/156,749

(22) Filed: Jan. 16, 2014

(65) Prior Publication Data

US 2014/0136715 A1 May 15, 2014

Related U.S. Application Data

(62) Division of application No. 12/879,865, filed on Sep. 10, 2010, now Pat. No. 8,677,004.

(51) Int. Cl.
| | |
|---|---|
| *G06F 15/173* | (2006.01) |
| *G06F 15/16* | (2006.01) |
| *G06F 9/50* | (2006.01) |
| *G06F 9/48* | (2006.01) |
| *H04L 29/08* | (2006.01) |
| *H04L 29/06* | (2006.01) |

(52) U.S. Cl.
CPC ............ *G06F 9/5027* (2013.01); *G06F 9/4856* (2013.01); *H04L 67/148* (2013.01); *H04L 69/162* (2013.01)

(58) Field of Classification Search
CPC ............................ H04L 67/148; H04L 69/162
USPC .................................................. 709/224, 231
See application file for complete search history.

(56) References Cited

U.S. PATENT DOCUMENTS

| | | | |
|---|---|---|---|
| 6,104,717 A * | 8/2000 | Coile et al. ..................... | 370/401 |
| 6,324,177 B1 * | 11/2001 | Howes et al. .................. | 370/389 |
| 6,445,704 B1 * | 9/2002 | Howes et al. .................. | 370/392 |
| 8,185,776 B1 * | 5/2012 | Gentes et al. ................. | 714/4.11 |
| 8,352,608 B1 * | 1/2013 | Keagy et al. ................... | 709/226 |
| 8,756,197 B1 * | 6/2014 | Wilde et al. .................... | 707/640 |
| 2003/0088650 A1 | 5/2003 | Fassold et al. | |
| 2007/0244938 A1 * | 10/2007 | Michael et al. ............... | 707/204 |
| 2008/0189432 A1 | 8/2008 | Abali et al. | |
| 2008/0267176 A1 | 10/2008 | Ganesh et al. | |
| 2008/0270422 A1 | 10/2008 | Craft et al. | |
| 2008/0270829 A1 | 10/2008 | Craft et al. | |
| 2008/0294703 A1 | 11/2008 | Craft et al. | |

(Continued)

*Primary Examiner* — Karen Tang
(74) *Attorney, Agent, or Firm* — DeLizio Law, PLLC

(57) ABSTRACT

A method includes receiving, into a target machine communicatively coupled to a first subnetwork, data for migration of a virtual partition from a source machine communicatively coupled to a second subnetwork. The virtual partition has a source network address defined by network addressing of the second subnetwork. The method includes initiating restart of the virtual partition on the target machine, wherein the initiating comprises determining a socket connection providing network communication between the virtual partition and a host and transmitting, through a network tunnel communication from the target machine to the host, a communication providing a target network address that is assigned to the virtual partition after the virtual partition is migrated to the target machine. The method includes routing a packet, from a process executing in the virtual partition of the target machine, to the host based on the virtual partition having the target network address.

14 Claims, 7 Drawing Sheets

(56) References Cited

U.S. PATENT DOCUMENTS

| | | |
|---|---|---|
| 2008/0295111 A1 | 11/2008 | Craft et al. |
| 2008/0320122 A1 | 12/2008 | Houlihan et al. |
| 2008/0320123 A1 | 12/2008 | Houlihan et al. |
| 2008/0320269 A1 | 12/2008 | Houlihan et al. |
| 2009/0037550 A1 | 2/2009 | Mishra et al. |
| 2009/0094445 A1 | 4/2009 | Brandyberry et al. |
| 2009/0094582 A1 | 4/2009 | Craft et al. |
| 2009/0094624 A1 | 4/2009 | Craft et al. |
| 2009/0112965 A1 | 4/2009 | Ganesh et al. |
| 2009/0112969 A1 | 4/2009 | Ganesh et al. |
| 2009/0129385 A1 | 5/2009 | Wray et al. |
| 2009/0132708 A1 | 5/2009 | Hayward et al. |
| 2009/0157882 A1* | 6/2009 | Kashyap ............... 709/227 |
| 2009/0288084 A1* | 11/2009 | Astete et al. ............ 718/1 |
| 2009/0300605 A1 | 12/2009 | Edwards et al. |
| 2009/0313447 A1* | 12/2009 | Nguyen et al. ............ 711/162 |
| 2009/0327392 A1 | 12/2009 | Tripathi et al. |
| 2010/0082816 A1 | 4/2010 | Kharat et al. |
| 2010/0083283 A1 | 4/2010 | Kharat et al. |
| 2010/0094948 A1 | 4/2010 | Ganesh et al. |
| 2010/0169537 A1 | 7/2010 | Nelson et al. |
| 2010/0257263 A1 | 10/2010 | Casado et al. |
| 2010/0287263 A1 | 11/2010 | Liu et al. |
| 2010/0287548 A1* | 11/2010 | Zhou et al. ............ 718/1 |
| 2010/0325284 A1 | 12/2010 | Heim et al. |
| 2011/0019676 A1 | 1/2011 | Portolani et al. |
| 2011/0075674 A1 | 3/2011 | Li et al. |
| 2011/0119427 A1* | 5/2011 | Dow et al. ............ 711/6 |
| 2011/0119748 A1 | 5/2011 | Edwards et al. |
| 2011/0167196 A1* | 7/2011 | Scales et al. ............ 711/6 |
| 2012/0066389 A1 | 3/2012 | Hegde et al. |
| 2013/0060940 A1 | 3/2013 | Koponen et al. |
| 2013/0060947 A1 | 3/2013 | Nelson |
| 2014/0250093 A1* | 9/2014 | Prahlad et al. ............ 707/696 |

* cited by examiner

US 9,239,738 B2

MIGRATION OF LOGICAL PARTITIONS BETWEEN TWO DEVICES

RELATED APPLICATIONS

This application claims the priority benefit of U.S. application Ser. No. 12/879,865 filed Sep. 10, 2010.

BACKGROUND

Various computing platforms for large processing operations and data centers can provide services for databases, web hosting, virtualized environments, etc. A number of these large computing platforms incorporate multiple servers. The processing operations and data can be spread across these multiple servers. Some configurations can require that the server be shut down for servicing (upgrades, repairs, etc.). To enable this servicing without disrupting the services being provided, the processes and data can be migrated from a first hardware resource (e.g., a first server) to a second hardware resource (e.g., a second server). In particular, the processes and data can be part of a logical partition (e.g., a workload partition (WPAR)) that is migrated from the first hardware resource to the second hardware resource.

SUMMARY

Embodiments include a method comprising receiving, into a target machine communicatively coupled to a first subnetwork, data for migration of a virtual partition from a source machine communicatively coupled to a second subnetwork. The virtual partition has a source network address defined by network addressing of the second subnetwork and used while the virtual partition is executing on the source machine. The method includes initiating restart of the virtual partition on the target machine. The initiating comprises determining a socket connection providing network communication between the virtual partition and a host. The initiating also comprises transmitting, through a network tunnel communication from the target machine to the host, a communication providing a target network address that is assigned to the virtual partition after the virtual partition is migrated to the target machine. The method includes routing a packet, from a process executing in the virtual partition of the target machine, to the host based on the virtual partition having the target network address.

Embodiments include a target machine comprising a processor. The target machine also comprises a checkpoint module executable on the processor and configured to receive, into the target machine communicatively coupled to a first subnetwork, data for migration of a virtual partition from a source machine communicatively coupled to a second subnetwork. The virtual partition has a source network address defined by network addressing of the second subnetwork and used while the virtual partition is executing on the source machine. The checkpoint module is configured to initiate restart of the virtual partition on the target machine. As part of the initiation of the restart, the checkpoint module is configured to determine a socket connection providing network communication between the virtual partition and a host. As part of the initiation of the restart, the checkpoint module is configured to transmit, through a network tunnel communication from the target machine to the host, a communication providing a target network address that is assigned to the virtual partition after the virtual partition is migrated to the target machine. The target machine also includes a process executable on the processor and within the virtual partition. The process is configured to route a packet to the host based on the virtual partition having the target network address.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
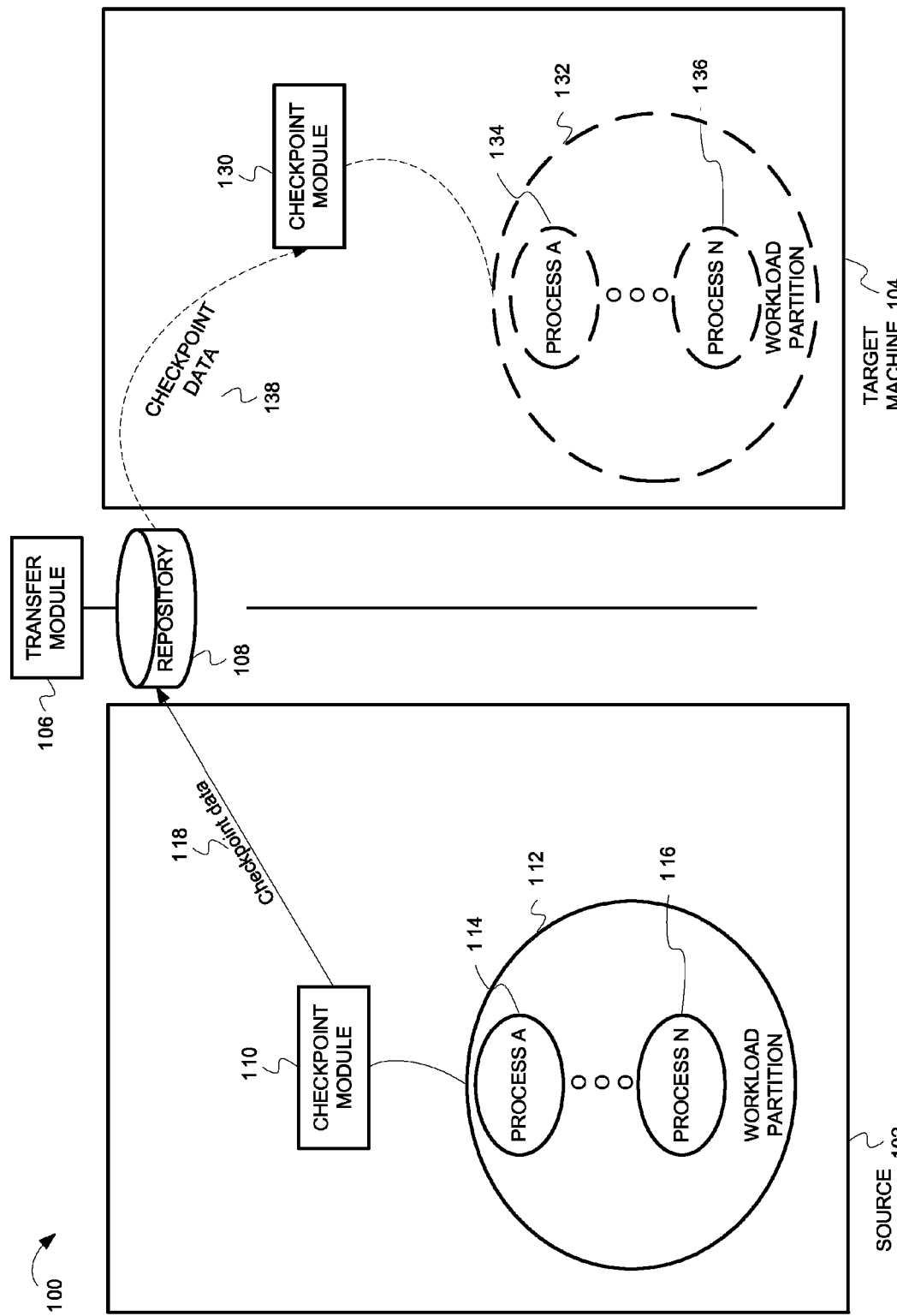
FIG. 1 is a block diagram illustrating migration of a workload partition from a source machine to a target machine, according to some example embodiments.

The description that follows includes exemplary systems, methods, techniques, instruction sequences, and computer program products that embody techniques of the present inventive subject matter. However, it is understood that the described embodiments may be practiced without these specific details. In other instances, well-known instruction instances, protocols, structures, and techniques have not been shown in detail in order not to obfuscate the description.

Some example embodiments include a virtual input output server (VIOS). A VIOS allows sharing of physical resources between logical partitions (LPAR). An LPAR is generally a subset of a computer's hardware resources, where the subset is virtualized and an LPAR can operate as a separate computing device. In effect, a physical machine can be partitioned into multiple LPARs, each housing a separate operating system. A VIOS can operate as a partitioned hardware adapter and can service end devices or logical devices such as an Internet small computer system interface (iSCSI) adapter, compatible disks, Fibre-Channel disks, Ethernet drives, compact disks (CD), digital video disks (DVD), and optical drives or devices. A VIOS, therefore, can allow for sharing of physical resources of the device(s) among multiple virtual machines. For instance, a computer device can execute multiple operating system images at a same time while the operating systems are isolated from each other across multiple virtual machines.

The LPARs can include multiple workload partitions (WPARs). In particular, one feature that can facilitate moving a workload or a workload partition from hardware resource to hardware resource is code that is set up to operate as a workload partition. Accordingly an LPAR can be broken up into multiple WPARSs. Generally, mobile WPARs are WPARs that have characteristics that allow the workload partition to be moved or migrated from physical machine to physical machine, or from a source machine to a target machine. WPARs can be multiple virtualize operating systems that operate within a single copy of an operating system. Applications can have a private execution environment. The applications can be isolated in terms of process, signal and file system. Further, applications can have their own unique users, groups, and dedicated network addresses. Inter-process communication can be restricted to processes executing in the same workload partition. Accordingly, a WPAR can be transparent as most applications are unaware of the software creating the workload partition and thus most application can run, unmodified in a WPAR. Workload partitions can establish limits on threads, processes, etc. To migrate the mobile WPARs, data (known as checkpoint data) is transferred from the source machine to a common repository. The target machine can then access the checkpoint data from the common repository. While described such that the checkpoint data is stored and then retrieved from the repository 108, in some other example embodiments, the source machine can transmit the checkpoint data directly to the target machine. Examples described herein include migration of a WPAR from one machine to a different machine. Embodiments are not so limited. In particular, example embodiments can be migrated any type of virtual partition (e.g., WPAR, LPAR, etc.), virtual machine, etc.

Conventional systems are limited to migration of partitions (LPAR, WPAR, etc.) within a subnetwork (subnet). As described below, some example embodiments enable the migration of partitions beyond a given subnet. In some example embodiments, socket connections (e.g., Transmission Control Protocol (TCP), User Datagram Protocol (UDP), Stream Control Transmission Protocol (SCTP), etc.) can continue to operate even when the Internet Protocol (IP) address changes for a logical partition. Specifically, the socket connections can continue when logical partitions are migrated outside a subnet boundary. Connection-oriented protocols (e.g., TCIP, SCTP, etc.) and connection-less protocols (e.g., UDP) identify connection identifications (IDs) using a tuple (protocol, source IP address, source port, destination IP address, and destination port). Accordingly, problems can occur in continuing the connection IDs from the new logical partition location, because the network prefixes are changed when the logical partition is migrated beyond a subnet. Also, a network address for a logical partition can be aliased as long as the logical partition remains in a same subnet. Therefore, a network address on one subnet is unaliasable to a network address on a different subnet.

Some example embodiments renegotiate socket connections, wherein the workload is one endpoint of the socket connections. Some example embodiments notify the other endpoint (e.g., another machine) of the socket connection using network tunnel communications (e.g., IP-in-IP tunneling). In particular, this tunneling provides notification to the other endpoint that the network address of the workload partition is changing along with the new network address itself. As further described below, in some example embodiments, a three-way connection handshake is used to renegotiate the socket connections.

Therefore, some example embodiments facilitate socket renegotiation after migration of a partition from one device to a different device. Also, some example embodiments are applicable to a partition that is multi-homed. In particular, a multi-home partition is communicatively coupled to at least two different subnets. Some example embodiments allow for a partition that is multi-homed to multiple subnets to be migrated to a machine that is not multi-homed to those same subnets. Also, some example embodiments are applicable to other areas of network technology including managing connections over changing temporary addresses. Further, some example embodiments can be applicable to any network technology wherein existing socket connections can change for any number of reasons (e.g., relocation, new temporary address assigned, interface network address change, etc.).

FIG. 1 is a block diagram illustrating migration of a workload partition from a source machine to a target machine, according to some example embodiments. A source machine 102 is communicatively coupled over a network to a transfer module 106 and a repository 108. Similarly, the target machine 104 is communicatively coupled over a network to the transfer module 106 and the repository 108. As further described below, the source machine 102 and the target machine 104 are part of two different subnetworks (i.e., subnets). The transfer module 106 and the repository 108 can be on one of the two subnets for the source machine 102 and the target machine 104 or on a separate subnet. The transfer module 106 and repository 108 can be on same or different machines (e.g., servers).

The source machine 102 includes a workload partition 112 and a checkpoint module 110. The workload partition 112 can include one to N number of processes executing therein (process A 114, process N 116, etc.). While not shown, the workload partition 112 can be part of a logical partition (LPAR). Also not shown, the source machine 102 can have one to N number of logical partitions that can include one to N number of workload partitions. The target machine 104 includes a checkpoint module 130. As shown, the workload partition 112 is migrated from the source machine 102 to the target machine 104 (shown as a workload partition 132). Accordingly, the process A 114, the process N 116, etc. correspond to a process A 134, a process N 136, etc., respectively.

The checkpoint module 110 creates checkpoint data 118 based on the data associated with and the processes executing in the workload partition 112. The checkpoint data 118 includes instructions to restart the processes, recreate the data, etc. on the target machine 104. For example, the checkpoint data 118 can include loader data (e.g., shared library data), the heap and stack for a given process, etc. In this example embodiment, the transfer module 106 stores the checkpoint data 118 in the repository 108. The checkpoint module 130 can then retrieve the checkpoint data (138) to recreate the workload partition 132 on the target machine 104.

While described such that the checkpoint data is stored and then retrieved from the repository 108, in some other example embodiments, the source machine 102 can transmit the checkpoint data directly to the target machine 104. Also, the source machine 102 and the target machine 104 can include a number of different other components (not shown). A more detailed example of one of these machines having multiple logical partitions is described below in conjunction with FIG. 7.

Figure 2:
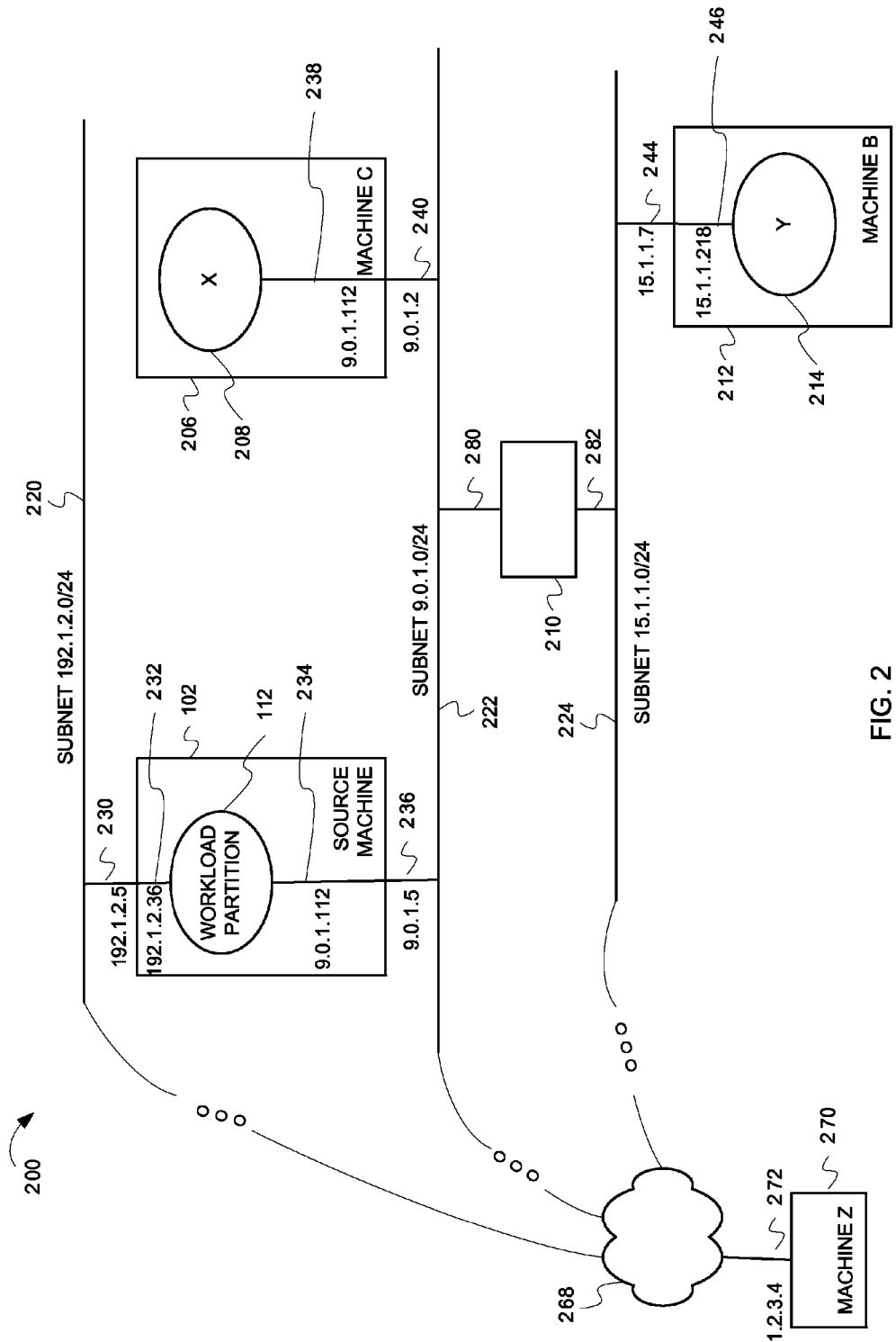
FIG. 2 is a block diagram illustrating machines on multiple subnetworks (subnets) for migration of a workload partition, according to some example embodiments.

FIG. 2 is a block diagram illustrating machines on multiple subnetworks (subnets) for migration of a workload partition, according to some example embodiments. FIG. 2 includes a system 200 that includes four different machines (the source machine 102, a machine B 212, a machine C 206, and a machine Z 270). These machines can be servers, client devices, or any other type of computer or resource that can communicate over a network. The machines can include one or more WPARs and LPARs that can be migrated to another machine. The source machine 102 includes the workload partition 112. The machine B 212 includes a workload partition Y 214 that is representative of the workload partition 112 if workload partition 112 is migrated from the source machine 102 to the machine B 212. The machine C 206 includes a workload partition X 208 that is representative of the workload partition 112 if the workload partition 112 is migrated from the source machine 102 to the machine C 206.

The source machine 102 is multi-homed having interfaces to two different subnets. In particular, the source machine 102 has a first Internet Protocol (IP) address 192.1.2.36 (reference 232) at an interface 230 having an IP address 192.1.2.5 for a subnet 220 having IP addresses 192.1.2.0/24. The source machine 102 has a second IP address 9.0.1.112 (reference 234) at an interface 236 having an IP address 9.0.1.5 for a subnet 222 having IP addresses 9.0.1.0/24.

The machine B 212 has an interface 244 having an IP address 15.1.1.7 to one subnet (a subnet 224 having IP addresses 15.1.1.0/24). The associated IP address for the interface 244 for the machine B 212 is 15.1.1.218 (reference 246). Also, the subnet 222 is communicatively coupled to the subnet 224 through a router 210. The router has an interface 280 into the subnet 222 and an interface 282 into the subnet 224. The machine C 206 has an interface 240 having an IP address 9.0.1.2 to one subnet (the subnet 222). The associated IP address for the interface 240 for the machine C 106 is 9.0.1.112 (reference 238). The machine Z 270 is communicatively coupled to each of the subnets 220-224 through a network 268. The machine Z 270 has an interface 272 having an IP address 1.2.3.4. In this example, there is a socket connection between one or more processes in the workload partition 112 and the machine Z 270. Therefore, the workload partition 112 and the machine 270 are the endpoints of the socket connection. The example provided herein is relative to one socket connection. However, in some example embodiments, there could be multiple logical partitions with multiple workload partitions, wherein each workload partition has numerous processes. Accordingly, in some applications, there could be any number of socket connections.

Figure 3:
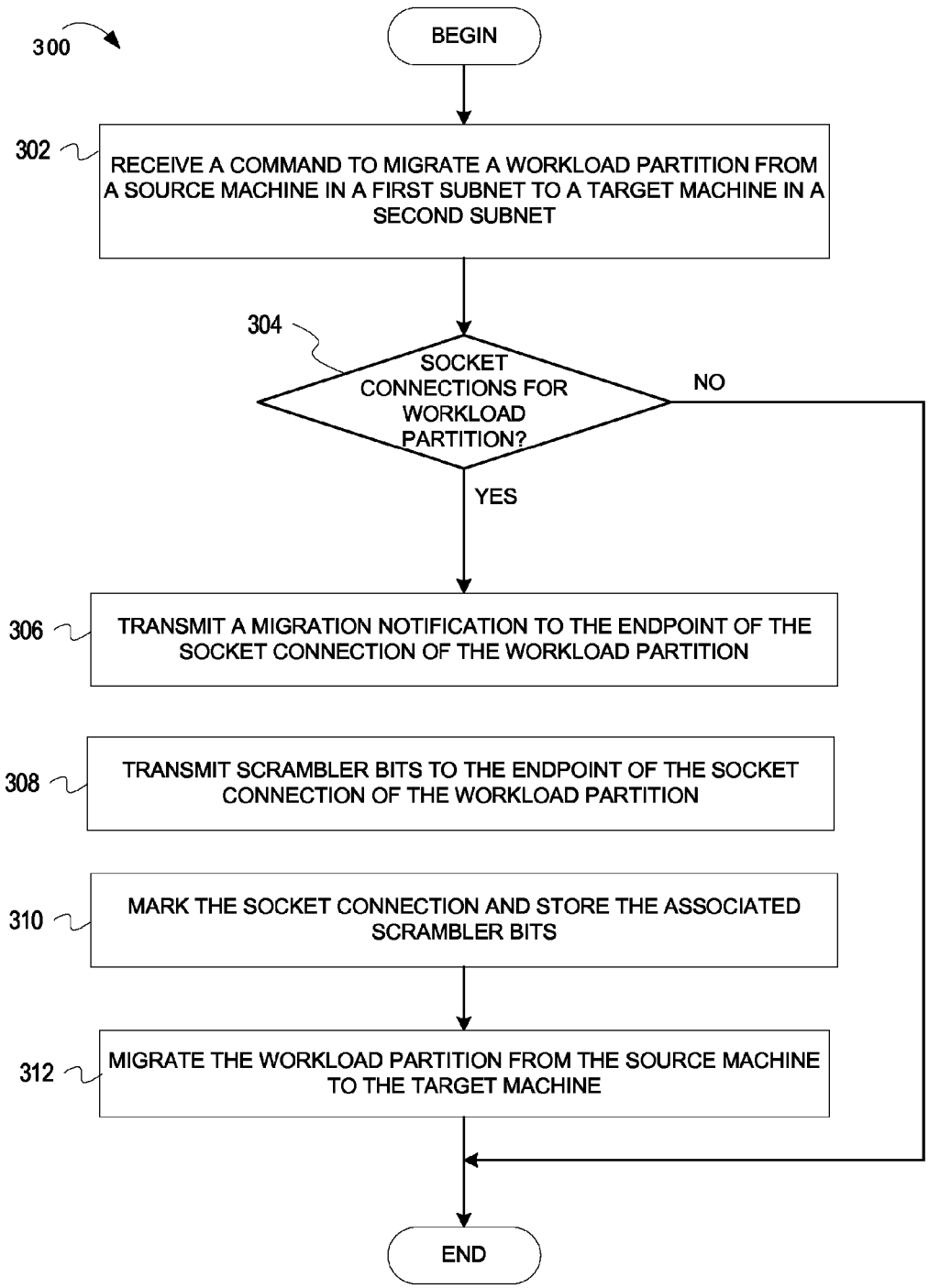
FIG. 3 is a flowchart illustrating migration of a workload partition from a source machine in a first subnetwork into a target machine in a second subnetwork, according to some example embodiments.
Figure 4:
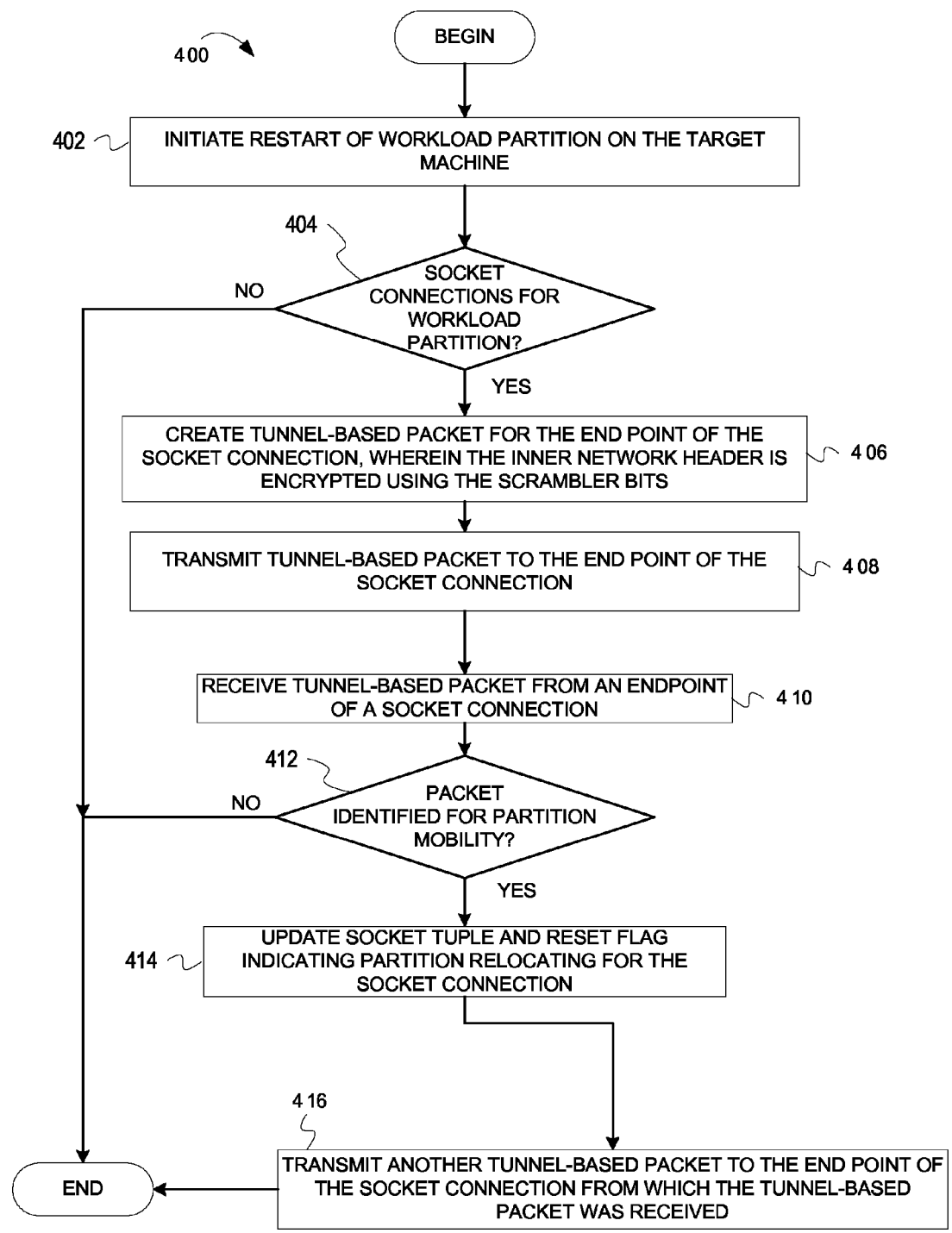
FIG. 4 is a flowchart illustrating processing of a migrated workload partition received from a source machine in a first subnetwork into a target machine in a second subnetwork, according to some example embodiments.
Figure 5:
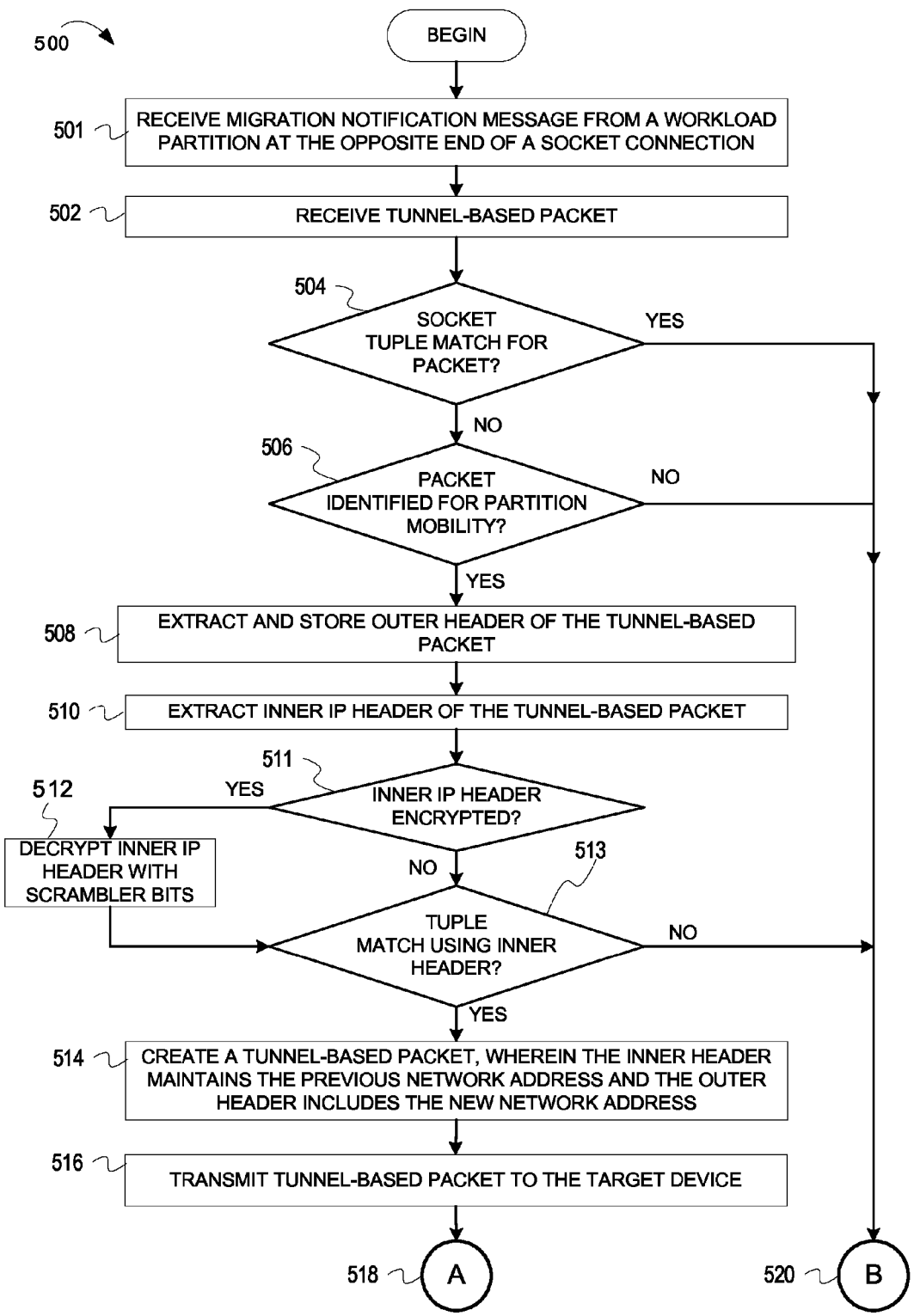
FIGS. 5-6 are flowcharts illustrating processing at an endpoint opposite a workload partition when the workload partition migrates to a different having a different subnetwork, according to some example embodiments.
Figure 6:
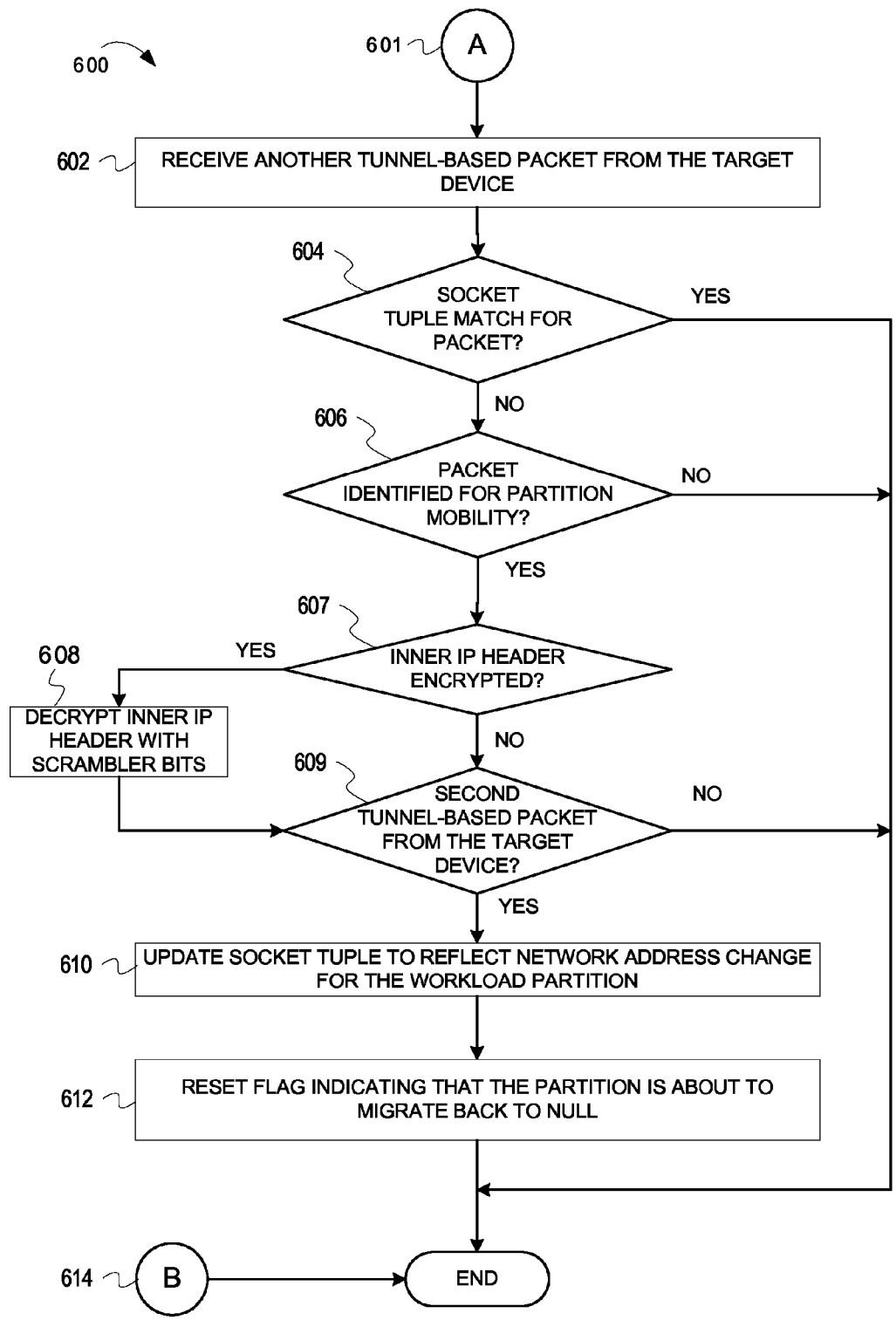

Operations for migration of a workload partition into a different subnet are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Three different flowcharts across four different figures are now described. FIG. 3 illustrates a first flowchart that is from a perspective of the source machine from which the workload partition migrates. FIG. 4 illustrates a second flowchart that is from a perspective of the target machine to which the workload partition is migrating. FIGS. 5-6 illustrate a third flowchart that is from a perspective of an endpoint of a socket connection that is communicatively coupled to one or more processes of the workload partition. FIGS. 3-6 are described in reference to migration of one workload partition having one socket connection. However, the operations described below can be performed on one to N number of workload partitions having one to N number of socket connections.

In particular, FIG. 3 is a flowchart illustrating migration of a workload partition from a source machine in a first subnetwork into a target machine in a second subnetwork, according to some example embodiments. A flowchart 300 includes operations that can be performed by components on the source machine 102 described in reference to FIGS. 1 and 2, respectively. Therefore, FIG. 3 is described with reference to FIGS. 1-2.

The checkpoint module 110 in the source machine 102 receives a command to migrate a workload partition from the source machine in a first subnet to a target machine in a second subnet (302). For example, the command can be received in response to a determination that the source machine 102 is being shut down for maintenance, upgrade to hardware, software, or firmware, etc. Accordingly, the workload partition is to be migrated so that the processes can continue running without materially affecting the users executing the processes. FIG. 2 provides two examples of target machines on different subnets relative to the source machine. With reference to FIG. 2, assume the workload partition 112 is migrated to the machine B 212. In the source machine 102, the workload partition 112 is either communicating over the subnet 220 (192.1.2.0/24) and/or the subnet 222 (9.0.1.0/24). When migrated to the machine B 212, the workload partition (shown as 214) is communicating over a different subnet, the subnet 224 (15.1.1.0/24). As an alternative example, assume that the workload partition 112 is being migrated to the machine C 206. Also, assume in the source machine 102 that the workload partition 112 is multi-homed (communicating over both the subnet 220 and the subnet 222). When migrated to the machine C 206, the workload partition (shown as 208) is only communicating over the subnet 222. The workload partition 208 is not communicating on the subnet 220. Therefore, in both of these examples, the workload partition is moving to a different subnet. In either scenario, the network address needs to be changed and cannot be simply aliased after relocation because of the subnet is changing. Operations of the flowchart 300 continue.

The checkpoint module 110 determines whether there are socket connections for the workload partition that is being migrated (304). In some example embodiments, this determination occurs during the checkpoint operations for migration of the workload partition. A protocol control block (not shown) can maintain a list of the different socket connections. Accordingly, the checkpoint module 110 can query the protocol control block on whether there are any socket connections for the workload partition 112. In some example embodiments, a socket connection has an associated socket tuple that defines the protocol, the network addresses and the ports on each side of the socket connection. For example, the socket tuple can include (protocol, source network address, source port, destination network address, destination port). If there are no socket connections for the workload partition 112, the operations of the flowchart 300 are complete. Otherwise, operations continue.

The checkpoint module 110 transmits a migration notification message to the endpoint on the opposite end of the socket connection (306). This notification message alerts the endpoint that the network address for the workload partition is about to change. In response, the endpoint will be on notice that a tunnel communication will follow that provides this new network address. In some example embodiments, the tunnel communication is an IP-in-IP tunnel packet. This tunnel communication is further described below. In particular, the receiving of this migration notification message initiates the operations of a flowchart 500 of FIG. 5 (described in more detail below). With reference to FIGS. 1-2, assume that there is a socket connection between the workload partition 112 (the first endpoint) and the machine Z 270 (the second endpoint). The checkpoint module 110 on the source machine 102 transmits the migration notification message to the machine Z 270. Operations of the flowchart 300 continue.

The checkpoint module 110 transmits scrambler bits to the endpoint of the socket connection of the workload partition (308). The scrambler bits can be a 32 bit value. As further described below, the scrambler bits can be used as identification bits for matching with the packets. Also, the scrambler bits can be used for encryption to secure the inner IP header. As an example, the scrambler bits can be used in an XOR operation on the encapsulated network address. This encryption can protect the socket connection from being moved to an unauthorized network address. In some example embodiments, the migration notification message and the scrambler bits are sent as separate messages. Operations of the flowchart 300 continue.

The checkpoint module 110 marks the socket connection and stores the associated scrambler bits (310). In particular, the checkpoint module 110 can store this mark and associated scrambler bits within the checkpoint data that is transmitted from the source machine to the target machine (as part of the migration of the workload partition). With reference to FIG. 1, the checkpoint module 110 can store this information as part of the checkpoint data 118 that is transmitted to the target machine 104. Operations of the flowchart 300 continue.

The checkpoint module 110 migrates the workload partition from the source machine to the target machine. As described above, this migration includes the transfer of checkpoint data to the target machine to enable the target machine to reinstantiate the different processes and their states in the workload partition on the target machine. With reference to FIGS. 1-2, the workload partition 112 is migrated from the source machine 102 to the machine B 212 or the machine C 206. For example, the checkpoint module 110 can output the checkpoint data 118 for storage in the repository 108. Alternatively or in addition, the checkpoint module 110 can output the checkpoint data 118 directly to the target machine 104. The operations of the flowchart 300 are complete.

Operations from the perspective of the target machine are now described. In particular, FIG. 4 is a flowchart illustrating processing of a migrated workload partition received from a source machine in a first subnetwork into a target machine in a second subnetwork, according to some example embodiments. A flowchart 400 includes operations that can be performed by components on the target machine 104 described in reference to FIG. 1 and components of either the machine C 206 or the machine B 212 (considered target machines) in reference to FIG. 2. Therefore, FIG. 4 is described with reference to FIGS. 1-2.

The checkpoint module 130 on the target machine initiates a restart of the workload partition on the target machine (402). With reference to FIG. 2, assume that the machine B 212 is the target machine. The workload partition would be workload partition 214 having a new network address of 15.1.1.218. The restart operation can include reinstantiating the processes of the workload partition 214 and their prior states on the source machine 102 after execution was stopped. Operations of the flowchart 400 continue.

The checkpoint module 130 determines whether there are any socket connections for the workload partition (404). As describe above, the checkpoint module 130 can make this determination based on the checkpoint data received as part of the migration of the workload partition. If there are no socket connections for the workload partition, operations of the flowchart 400 are complete. Otherwise, operations of the flowchart 400 continue.

The checkpoint module 130 creates a tunnel-based packet for transmission to the endpoint at the opposite end of the socket connection from the workload partition 406). In some example embodiments, the tunnel-based packet comprises an IP-in-IP tunnel packet, wherein IP addresses (both source and destination) are encapsulated in an IP packet. With reference to FIG. 2, the outer IP header comprises the new network address for the workload partition. Accordingly, the outer socket tuple includes (source address=15.1.1.218; destination address=1.2.3.4). The inner IP header comprises the original network address for the workload partition. Accordingly, the inner socket tuple includes (source address=192.1.2.36; destination address=1.2.3.4). To help identify the tunnel-based packet, the packet comprises a destination header option that indicates that the packet type is "partition mobility." Also, the destination header option can comprise a flag that indicates whether the inner IP header is encrypted. For example, the flag can be a single bit—1 indicating the inner IP header is scrambled or 2 indicating the inner IP header is not scrambled. Therefore, in some example embodiments, the inner IP header is encrypted with the scrambler bits that was previously transmitted to the other endpoint (see 308 of FIG. 3). Such encryption is to protect false IP-in-IP packets that cause IP security vulnerability by malicious intruders on the network. Operations of the flowchart 400 continue.

The checkpoint module 130 transmits the tunnel-based packet to the other endpoint of the socket connection (408). With reference to FIG. 2, the checkpoint module 130 transmits the tunnel-based packet to the machine Z 270. The routing of the packet is based on the outer header with a socket tuple that includes (source address=15.1.1.218; destination address=1.2.3.4). As further described below, the machine Z 270 will not recognize this socket tuple based on the source address. However, because of the migration notification that was previously sent by the source machine prior to migration (see 306 of FIG. 3), the machine Z 270 does not discard the packet. Rather, the machine Z 270 performs additional processing of this packet, which is further described below in reference to FIGS. 5-6. Operations of the flowchart 400 continue.

The checkpoint module 130 receives a tunnel-based packet back from the endpoint of the socket connection (410). This tunnel-based packet is transmitted from the endpoint in response to receiving the tunnel-based packet transmitted previously (see 408 above). This transmission of this tunnel-based packet is further described below in reference to FIGS. 5-6. With reference to FIG. 2, the machine Z 270 transmits this tunnel-based packet back to the workload partition 214. The outer IP header comprises the new network address for the workload partition. Accordingly, the outer socket tuple includes (source address=1.2.3.4; destination address=15.1.1.218). The inner IP header comprises the original network address for the workload partition. Accordingly, the inner socket tuple includes (source address=1.2.3.4; destination address=192.1.2.36). Operations of the flowchart 400 continue.

The checkpoint module 130 determines whether this tunnel-based packet is identified for partition mobility (412). In particular, the checkpoint module 130 determines whether the packet type in the destination header option is "partition mobility." If the tunnel-based packet is not identified for partition mobility, the operations of the flowchart 400 are complete. Otherwise, the operations of the flowchart 400 continue.

The checkpoint module 130 updates the socket tuple and resets the flag (indicating partition relocating) for the socket connection (414). In particular, the checkpoint module 130 updates the socket tuple to include the new network address for the workload partition because of the migration of the partition. With reference to FIG. 2, the socket tuple for this socket connection would be changed (source address=15.1.1.218; destination address=1.2.3.4). Also, the checkpoint module 130 updates the flag for this socket connection that indicates that the associated workload partition is not relocating. Operations of the flowchart 400 continue.

The checkpoint module 130 transmits another tunnel-based pack back to the endpoint of the socket connection from which the tunnel-based packet was received (416). With reference to FIG. 2, the checkpoint module 130 transmits the tunnel-based packet to the machine Z 270. The routing of the packet is based on the outer header with a socket tuple that includes (source address=15.1.1.218; destination address=1.2.3.4). As further described below, the machine Z 270 will not recognize this socket tuple based on the source address. However, because of the migration notification that was previously sent by the source machine prior to migration (see 306 of FIG. 3), the machine Z 270 does not discard the packet. Rather, the machine Z 270 performs additional processing of this packet, which is further described below in reference to FIGS. 5-6. Operations of the flowchart 400 are complete.

Operations from the perspective of the endpoint opposite the workload partition on the socket connection are now described. In particular, FIGS. 5-6 are flowcharts illustrating processing at an endpoint opposite a workload partition when the workload partition migrates to a different having a different subnet, according to some example embodiments. A flowchart 500 includes operations that can be performed by components on the machine Z 270 described in reference to FIG. 2. Therefore, FIGS. 5-6 are described with reference to FIGS. 1-2.

The machine Z 270 receives a migration notification message from a workload partition at the opposite end of a socket connection (to which the machine Z 270 is coupled) (501). With reference to FIGS. 1-2, this message is received from the checkpoint module 110 executing on the source machine 102 (also see 306 in FIG. 3). Operations of the flowchart 500 continue.

The machine Z 270 receives a tunnel-based packet from the target device (502). With reference to FIGS. 1-2, the checkpoint module 130 executing on the target device transmits the tunnel-based packet (also see 408 of FIG. 4). The routing of the packet is based on the outer header with a socket tuple that includes (source address=15.1.1.218; destination address=1.2.3.4). Operations of the flowchart 500 continue.

The machine Z 270 determines whether there is a socket tuple match for the received packet (504). In particular, the machine Z 270 determines whether this packet is a non-tunnel-based packet that is transmitted between one of its socket connections. If there is a socket tuple match, the operations of the flowchart 500 continue at B (520), which is the end of the operations for the flowcharts 500 and 600. In particular, if there is a socket tuple match, the machine Z 270 can process this packet as a non-tunnel-based packet received along one of its socket connections. If there is no socket tuple match, operations of the flowchart 500 continue.

The machine Z 270 determines whether this packet is a tunnel-based packet identified for partition mobility (506). In particular, the machine Z 270 determines whether the packet type in the destination header option is "partition mobility." If the tunnel-based packet is not identified for partition mobility, the operations of the flowchart 500 continue at B (520), which is the end of the operations for the flowcharts 500 and 600. Otherwise, the operations of the flowchart 500 continue.

The machine Z 270 extracts and stores an outer header of this tunnel-based packet (508). In some example embodiments, the tunnel-based packet comprises an IP-in-IP tunnel packet, wherein IP addresses (both source and destination) are encapsulated in an IP packet. With reference to FIG. 2, the outer IP header comprises the new network address for the workload partition. Accordingly, the outer header includes (source address=15.1.1.218; destination address=1.2.3.4). This data is subsequently used to reassign the network address for the workload partition (as further described below). In particular, the new network address for the workload partition will be 15.1.1.218. The operations of the flowchart 500 continue.

The machine Z 270 extracts an inner header of this tunnel-based packet (510). As noted above, the tunnel-based packet can comprise an IP-in-IP tunnel packet, wherein IP addresses (both source and destination) are encapsulated in an IP packet. The inner IP header comprises the original network address for the workload partition. Accordingly, the inner socket tuple includes (source address=192.1.2.36; destination address=1.2.3.4). In some example embodiments, the inner IP header is encrypted with the scrambler bits that was previously transmitted to the other endpoint (see 308 of FIG. 3). Such encryption is to protect false IP-in-IP packets that cause IP security vulnerability by malicious intruders on the network. Operations of the flowchart 500 continue.

The machine Z 270 determines whether the inner IP header is encrypted with the scrambler bits (511). As described above, the destination header option can comprise a flag that indicates whether the inner IP header is encrypted. Accordingly, the machine Z 270 can make this determination based on this flag in the destination header option. If encrypted, operations of the flowchart 500 continue at 512. Otherwise, operations of the flowchart 500 continue at 513.

The machine Z 270 decrypts the inner IP header with the scrambler bits (512). As described above, these scrambler bits were previous transmitted to the machine Z 270. Operations of the flowchart 500 continue.

The machine Z 270 determines whether there is a socket tuple match using the inner header (513). In particular, the machine Z 270 determines whether this socket tuple matches the socket tuple from a previous packet that comprises a migration notification message (see 501 above). If so, this is considered as a first successful socket renegotiation packet (similar to a syncing in a three-way handshake). If there is not a socket tuple match, the operations of the flowchart 500 continue at B (520), which is the end of the operations for the flowcharts 500 and 600. Otherwise, the operations of the flowchart 500 continue.

The machine Z 270 creates a tunnel-based packet, wherein the inner header maintains the previous network address and the outer header includes the new network address for the workload partition (514). In some example embodiments, the tunnel-based packet comprises an IP-in-IP tunnel packet, wherein IP addresses (both source and destination) are encapsulated in an IP packet. With reference to FIG. 2, the outer IP header comprises the new network address for the workload partition. Accordingly, the outer socket tuple includes (source address=1.2.3.4; destination address=15.1.1.218). The inner IP header comprises the original network address for the workload partition. Accordingly, the inner socket tuple includes (source address=1.2.3.4; destination address=192.1.2.36). To help identify the tunnel-based packet, the packet comprises a destination header option that indicates that the packet type is "partition mobility." With reference to a three-way handshake, this packet can be considered the sync-acknowledgement segment. Operations of the flowchart 500 continue.

The machine Z 270 transmits the tunnel-based packet to the other endpoint of the socket connection—the target device (516). With reference to FIG. 2, the machine Z 270 transmits the tunnel-based packet to the machine B 212. The routing of the packet is based on the outer header with a socket tuple that includes (source address=1.2.3.4; destination address=15.1.1.218). Operations of the flowchart 500 continue at B (518). This is a completion of the flowchart 500 and the start of the flowchart 600 that is now described.

In particular, the flowchart 600 is a continuation of the flowchart 500. The flowchart 600 includes a continuation of the operations from the perspective of the endpoint opposite the workload partition on the socket connection. Like the flowchart 500, the flowchart 600 includes operations that can be performed by components on the machine Z 270 described in reference to FIG. 2.

The machine Z 270 receives another tunnel-based packet from the target device (602). In particular, the machine Z 270 receives this packet in response to the previous transmission of the tunnel-based packet to the target device (see 416 of FIG. 4). In some example embodiments, the tunnel-based packet comprises an IP-in-IP tunnel packet, wherein IP addresses (both source and destination) are encapsulated in an IP packet. The routing of the packet is based on the outer header with a socket tuple that includes (source address=15.1.1.218; destination address=1.2.3.4). With reference to a three-way handshake, this packet can be considered the completion of the renegotiation. Operations of the flowchart 600 continue.

The machine Z 270 determines whether there is a socket tuple match for the received packet (604). In particular, the machine Z 270 determines whether this packet is a non-tunnel-based packet that is transmitted between one of its socket connections. If there is a socket tuple match, the operations of the flowchart 600 are complete. In particular, if there is a socket tuple match, the machine Z 270 can process this packet as a non-tunnel-based packet received along one of its socket connections. If there is no socket tuple match, operations of the flowchart 600 continue.

The machine Z 270 determines whether this packet is a tunnel-based packet identified for partition mobility (606). In particular, the machine Z 270 determines whether the packet type in the destination header option is "partition mobility." If the tunnel-based packet is not identified for partition mobility, the operations of the flowchart 600 are complete. Otherwise, the operations of the flowchart 600 continue.

The machine Z 270 determines whether the inner IP header is encrypted with the scrambler bits (607). As described above, the destination header option can comprise a flag that indicates whether the inner IP header is encrypted. Accordingly, the machine Z 270 can make this determination based on this flag in the destination header option. If encrypted, operations of the flowchart 600 continue at 608. Otherwise, operations of the flowchart 600 continue at 609.

The machine Z 270 decrypts the inner IP header with the scrambler bits (608). As described above, these scrambler bits were previous transmitted to the machine Z 270. Operations of the flowchart 600 continue.

The machine Z 270 determines whether this packet is the second tunnel-based packet identified for partition mobility from the target device (609). In particular, the machine Z 270 determines whether this packet is considered the completion of the renegotiation of the three-way handshake between the two endpoints of the socket connection. The machine Z 270 determines whether this socket tuple matches the socket tuple from the previous tunnel-based packet (see 502 of FIG. 5). If this packet is not the second tunnel-based packet identified for partition mobility, the operations of the flowchart 600 are complete. Otherwise, the operations of the flowchart 600 continue.

The machine Z 270 updates the socket tuple for this socket connection to reflect the network address change for the workload partition (610). The socket tuple is updated to include (source address=15.1.1.218; destination address=1.2.3.4). The operations of the flowchart 600 continue.

The machine Z 270 resets the flag indicating that the workload partition is about to migrate back to NULL. Accordingly, the socket connection between the workload partition on the machine Z 270 are back to normal network communications wherein the new network address for the workload partition is being used. Now, a process executing in the workload partition of the target machine and the machine Z 270 can route packets between each other based on the workload partition having its new network address from the target machine (15.1.1.218). The operations of the flowchart 600 are complete.

Error or packet loss (e.g., TCP/IP level errors, exceptions, packet loss, protocol deviations, etc.) can occur during this three-way connection handshake is used to renegotiate the socket connections. Some example embodiments incorporate operations to handle such error or packet loss that are similar to those operations for a three-way connection establishment, wherein such messaging are encapsulated using IP-in-IP.

Figure 7:
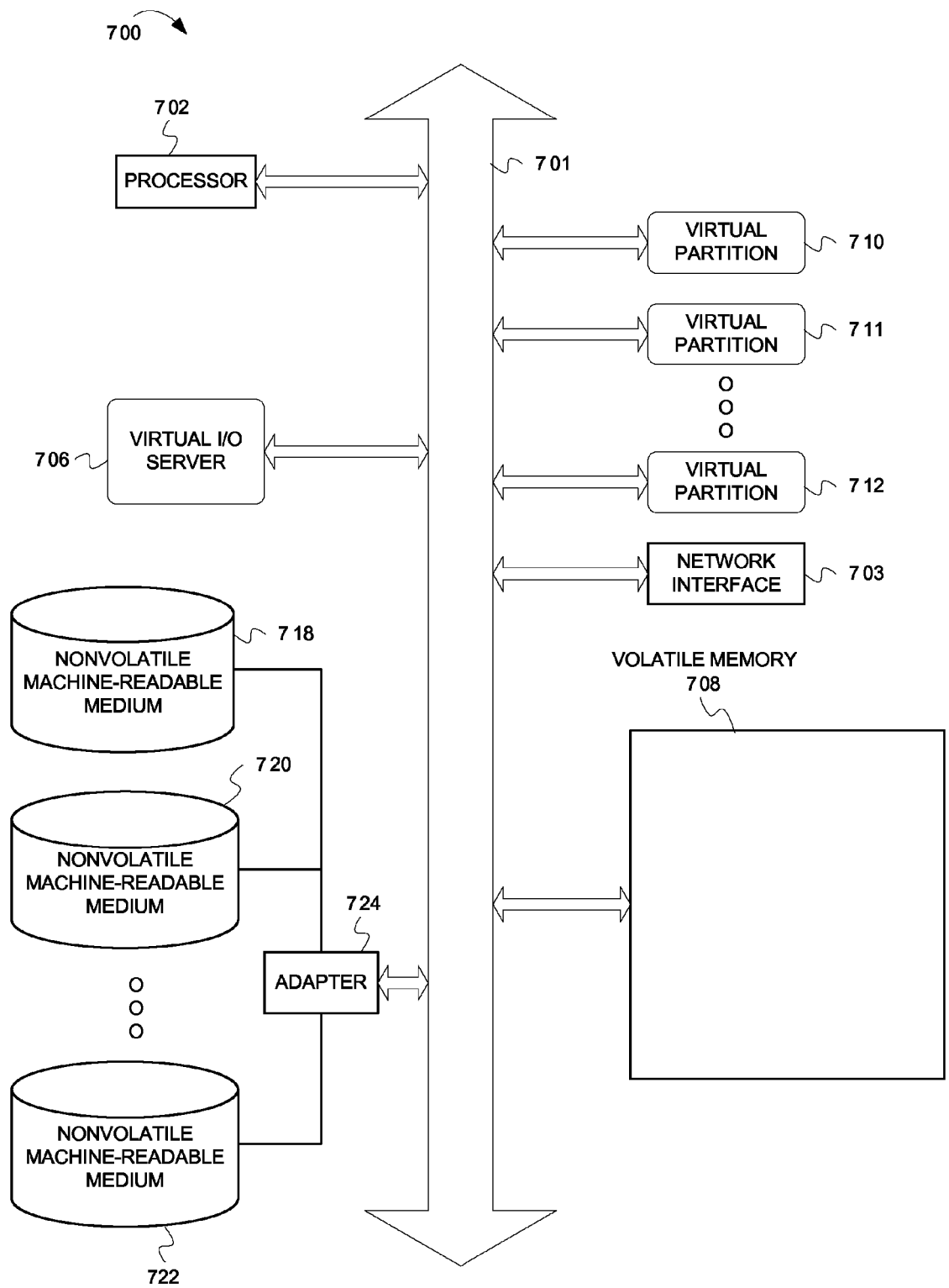
FIG. 7 is a block diagram illustrating a computer device with a virtualized environment, according to some example embodiments.

FIG. 7 is a block diagram illustrating a computer device with a virtualized environment, according to some example embodiments. A computer device 700 includes a processor 702 (possibly including multiple processors, multiple cores, multiple nodes, and/or implementing multi-threading, etc.). The computer device 700 includes a nonvolatile machine-readable medium 718, a nonvolatile machine-readable medium 720 and a nonvolatile machine-readable medium 722 that are communicatively coupled to the bus 701 through an adapter 724. The nonvolatile machine-readable media 718-722 can be various types of hard disk drives (e.g., optical storage, magnetic storage, etc.). The computer device 700 also includes a bus 701 (e.g., PCI, ISA, PCI-Express, Hyper-Transport®, InfiniBand®, NuBus, etc.) and a network interface 703 (e.g., an ATM interface, an Ethernet interface, a Frame Relay interface, SONET interface, wireless interface, etc.).

The computer device 700 includes a virtual I/O server 706 and a number of virtual partitions (a virtual partition 710, a virtual partition 711 and a virtual partition 712). In some example embodiments, each of the virtual partitions 710-712 serves as a software implementation of a machine. Each of the virtual partitions 710-712 can provide a system platform that enables execution of an operating system. The virtual partitions 710-712 share physical resources of the computer device 700. The virtual partitions can be a logical partition, workload partition, etc.

The operations of the virtual partitions 710-712 are described in more detail above. Any one of these operations can be partially (or entirely) implemented in hardware and/or on the processor 702. For example, the operations can be implemented with an application specific integrated circuit, in logic implemented in the processor 702, in a co-processor on a peripheral device or card, etc. The computer device 700 includes a volatile memory 708. The volatile memory 708 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the below described possible realizations of machine-readable media.

Further, realizations may include fewer or additional components not illustrated in FIG. 7 (e.g., video cards, audio cards, additional network interfaces, peripheral devices, etc.). The processor 702, the volatile memory 708, the nonvolatile machine-readable media 718-722, the virtual I/O server 706, the virtual machines 710-712, and the network interface 703 are coupled to the bus 701. Although illustrated as being coupled to a bus 701, the volatile memory 708 can be coupled to the processor 702.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving, into a target machine communicatively coupled to a first subnetwork, data for migration of a virtual partition from a source machine communicatively coupled to a second subnetwork, wherein the virtual partition has a source network address defined by network addressing of the second subnetwork and used while the virtual partition is executing on the source machine;
initiating restart of the virtual partition on the target machine, wherein the initiating comprises,
determining whether a prior socket connection existed between the source machine and the host for the virtual partition;
in response to determining that the prior socket connection existed, renegotiating the prior socket connection for subsequent communication between the virtual partition of the target machine and the host, wherein the renegotiating comprises,
creating a first packet that comprises,
a first outer header that defines a source address of the first packet as a target network address that is assigned to the virtual partition after the virtual partition is migrated to the target machine and that defines a destination address of the first packet as a host network address of the host, and
a first inner header that defines the source address of the first packet as the source network address of the virtual partition and that defines the destination address of the first packet as a host network address of the host, wherein the first packet includes an indication that marks a packet type of the first packet as partition mobility, and wherein the prior socket connection is reset and marked as being for partition relocating; and
transmitting, through a network tunnel communication from the target machine to the host, the first packet;
receiving a second packet from the host, in response to the first packet, wherein the second packet comprises,
a second outer header that defines a source address of the second packet as the host network address and that defines a destination address of the second packet as the target network address that is assigned to the virtual partition after the virtual partition is migrated to the target machine,
a second inner header that defines the source address of the second packet as the host network address and that defines the destination address of the second packet as the source network address of the virtual partition; and
routing a third packet, from a process executing in the virtual partition of the target machine, to the host based on the virtual partition having the target network address.

2. The method of claim 1, wherein the virtual partition comprises at least one of a workload partition and a logical partition.

3. The method of claim 1, wherein the source network address and the target network address comprise Internet Protocol (IP) addresses and wherein the network tunnel communication comprises an IP-in-IP tunnel communication.

4. The method of claim 3, wherein the socket connection has an associated socket tuple defining the addressing between the virtual partition and the host.

5. The method of claim 1, wherein renegotiating includes a three-way connection handshake between the target machine and the host to renegotiate the socket connection.

6. The method of claim 5, wherein the first packet and the second packet comprise Internet Protocol (IP)-in-IP tunnel communications.

7. A target machine comprising:
a processor;
a checkpoint module executable on the processor and configured to receive, into the target machine communicatively coupled to a first subnetwork, data for migration of a virtual partition from a source machine communicatively coupled to a second subnetwork, wherein the virtual partition has a source network address defined by network addressing of the second subnetwork and used while the virtual partition is executing on the source machine,
the checkpoint module configured to initiate restart of the virtual partition on the target machine, wherein as part of the initiation of the restart, the checkpoint module is configured to,
determine whether a prior socket connection existed between the source machine and the host for the virtual partition;
in response to a determination that the prior socket connection existed, renegotiate the prior socket connection for subsequent communication between the virtual partition of the target machine and the host, wherein the renegotiate comprises,
create a first packet that comprises,
a first outer header that defines a source address of the first packet as a target network address that is assigned to the virtual partition after the virtual partition is migrated to the target machine and that defines a destination address of the first packet as a host network address of the host, and
a first inner header that defines the source address of the first packet as the source network address of the virtual partition and that defines the destination address of the first packet as a host network address of the host, wherein the first packet includes an indication that marks a packet type of the first packet as partition mobility, and wherein the prior socket connection is reset and marked as being for partition relocating; and
transmit, through a network tunnel communication from the target machine to the host, a first packet;
receive a second packet from the host, in response to the first packet, wherein the second packet comprises,
a second outer header that defines a source address of the second packet as the host network address and that defines a destination address of the second packet as the target network address that is assigned to the virtual partition after the virtual partition is migrated to the target machine,
a second inner header that defines the source address of the second packet as the host network address and that defines the destination address of the second packet as the source network address of the virtual partition; and
a process executable on the process and within the virtual partition, the process configured to route a third packet to the host based on the virtual partition having the target network address.

8. The target machine of claim 7, wherein the virtual partition comprises at least one of a workload partition and a logical partition.

9. The target machine of claim 7, wherein the source network address and the target network address comprise Internet Protocol (IP) addresses and wherein the network tunnel communication comprises an IP-in-IP tunnel communication.

10. The target machine of claim 9, wherein the socket connection has an associated socket tuple defining the addressing between the virtual partition and the host.

11. The target machine of claim 7, wherein the renegotiate includes a three-way connection handshake between the target machine and the host to renegotiate the socket connection.

12. The target machine of claim 11, wherein the first packet and the second packet comprise an Internet Protocol (IP)-in-IP tunnel communications.

13. The method of claim 1, wherein the first inner header is encrypted with scrambler bits, wherein the scrambler bits were transmitted to the host by the source machine prior to the migration of the virtual partition.

14. The target machine of claim 7, wherein the first inner header is encrypted with scrambler bits, wherein the scrambler bits were transmitted to the host by the source machine prior to the migration of the virtual partition.

* * * * *